United States Patent
Frisbie

(10) Patent No.: US 10,554,692 B2
(45) Date of Patent: Feb. 4, 2020

(54) CROSS-ORIGIN COMMUNICATION IN RESTRICTED COMPUTER ENVIRONMENTS

(71) Applicant: Google LLC, Mountain View, CA (US)

(72) Inventor: Matthew Steven Frisbie, Redwood City, CA (US)

(73) Assignee: Google LLC, Mountain View, CA (US)

( * ) Notice: Subject to any disclaimer, the term of this patent is extended or adjusted under 35 U.S.C. 154(b) by 239 days.

(21) Appl. No.: 15/624,921

(22) Filed: Jun. 16, 2017

(65) Prior Publication Data

US 2018/0367572 A1 Dec. 20, 2018

(51) Int. Cl.
*G06F 17/00* (2019.01)
*H04L 29/06* (2006.01)

(52) U.S. Cl.
CPC ............... *H04L 63/20* (2013.01); *H04L 63/10* (2013.01)

(58) Field of Classification Search
CPC ......... H04L 63/20; H04L 67/34; H04L 63/10; G06F 21/6209; G06F 21/53; G06F 2221/2119
See application file for complete search history.

(56) References Cited

U.S. PATENT DOCUMENTS

| | | | |
|---|---|---|---|
| 8,291,475 B2 | 10/2012 | Jackson et al. | |
| 8,365,061 B1 * | 1/2013 | Bloom | G06F 16/958 715/205 |
| 8,930,971 B1 * | 1/2015 | Pinkovezky | G06Q 30/0277 705/14.4 |
| 9,037,963 B1 | 5/2015 | Chandi et al. | |
| 2002/0104070 A1 | 8/2002 | Adams | |
| 2004/0210536 A1 | 10/2004 | Gudelj et al. | |
| 2005/0254330 A1 | 11/2005 | Mick et al. | |
| 2006/0010134 A1 | 1/2006 | Davis et al. | |
| 2007/0101258 A1 | 5/2007 | Xu et al. | |
| 2007/0150603 A1 | 6/2007 | Crull et al. | |
| 2007/0208824 A1 | 9/2007 | Ullman et al. | |
| 2007/0299857 A1 | 12/2007 | Gwozdz et al. | |

(Continued)

FOREIGN PATENT DOCUMENTS

WO WO2008148111 12/2008

OTHER PUBLICATIONS

'blog.teamtreehouse.com' [online] "Cross-Domain Messaging with postMessage," Sep. 12, 2013, [retrieved on May 31, 2017] Retrieved from Internet: URL<http://blog.teamtreehouse.com/cross-domain-messaging-with-postmessage> 14 pages.

(Continued)

*Primary Examiner* — Trong H Nguyen
(74) *Attorney, Agent, or Firm* — Fish & Richardson P.C.

(57) ABSTRACT

This specification discloses techniques for communicating data between a first execution context on a computing system and a second execution context on the computing system. The first execution context can execute content from a first origin, the second execution context can execute content from a second origin that is different from the first origin, and the first execution context and the second execution context can each be restricted from accessing data of the other as a result of a same-origin policy implemented by the computing system. The method can include establishing a bi-directional communication channel between the first execution context and the second execution context.

20 Claims, 8 Drawing Sheets

(56) References Cited

U.S. PATENT DOCUMENTS

| | | | |
|---|---|---|---|
| 2007/0300064 A1 | 12/2007 | Isaacs et al. | |
| 2008/0263566 A1 | 10/2008 | Buerge et al. | |
| 2008/0298342 A1 | 12/2008 | Appleton et al. | |
| 2008/0313648 A1 | 12/2008 | Wang et al. | |
| 2009/0204886 A1 | 8/2009 | Xu et al. | |
| 2009/0265760 A1 | 10/2009 | Zhu | |
| 2009/0299862 A1 | 12/2009 | Fan et al. | |
| 2009/0300496 A1 | 12/2009 | Fan et al. | |
| 2010/0281107 A1* | 11/2010 | Fallows | G06F 9/54 709/203 |
| 2011/0188499 A1* | 8/2011 | Wijnands | H04L 12/56 370/390 |
| 2011/0231242 A1 | 9/2011 | Dilling et al. | |
| 2013/0173720 A1* | 7/2013 | Vasudev | H04L 51/18 709/206 |
| 2013/0198607 A1 | 8/2013 | Mischook et al. | |
| 2014/0047413 A1 | 2/2014 | Sheive et al. | |
| 2015/0082323 A1 | 3/2015 | Mikles | |
| 2015/0350253 A1* | 12/2015 | Alderson | H04L 63/20 726/1 |
| 2016/0110123 A1 | 4/2016 | Vega-Gonzalez | |
| 2016/0205215 A1* | 7/2016 | Mraz | H04L 45/04 709/219 |

OTHER PUBLICATIONS

'developer.mozilla.org' [online] "Message Channel( )," Mozilla Developer Network, 2005, [retrieved on May 31, 2017] Retrieved from Internet: URL< https://developer.mozilla org/en-US/docs/Web/API/MessageChannel/MessageChannel> 3 pages.

'developer.mozilla.org' [online] "Window.postMessage( )," 2005, [retrieved on May 31, 2017] Retrieved from Internet: URL< https://developer.mozilla.org/en-US/docs/Web/API/Window/postMessage> 7 pages.

'en.wikipedia.org' [online] "Web Messaging," Last Updated On: Sep. 7, 2016, [retrieved on May 31, 2017] Retrieved from Internet: URL< https://en.wikipedia.org/wiki/Web_Messaging> 3 pages.

'github.com' [online] "google/closure-library," Jan. 22, 2016 [retrieved on Jun. 5, 2017] Retrieved from Internet: URL<https://github.com/google/closure-library/blob/master/closure/goog/messaging/messagechannel.js#L41> 3 pages.

'google.github.io' [online] "Interface goog.messaging. MessageChannel," Date Unknown [retrieved on May 31, 2017] Retrieved from Internet: URL< https://google.github.io/closure-library/api/goog.messaging.MessageChannel.html> 3 pages.

'javascript.info' [online] "Cross-Window communication," Date Unknown, [retrieved May 31, 2017] Retrieved from Internet: URL< https://javascript.info/cross-window-communication> 11 pages.

'javascriptkit.com' [online] "Creating window remotes using the window.opener property," Feb. 18, 2009 [retrieved on May 31, 2017 from the wayback machine] Retrieved from Internet: URL<http://javascriptkit.com/javatutors/remote2.shtml> via Internet URL< https://web-beta.archive.org/web/20090218150003/http://javascriptkit.com/javatutors/remote2.shtml/> 2 pages.

'labs.detectify.com' [online] "detectify: How it works," Matthias Karlsson, Dec. 8, 2016, [retrieved on May 31, 2017] Retrieved from Internet: URL< https://labs.detectify.com/2016/12/08/the-pitfalls-of-postmessage/> 11 pages.

'www.codeproject.com' [online] "Accessing parent window from child window or vice versa using JavaScript by RKT,". Ashoka, Apr. 19, 2008, [retrieved Jul. 9, 2013] Retrieved from Internet: URL<http://www.codeproject.com/Articles/25388/Accessing-parent-window-from-child-window> 6 pages.

'www.viget.com' [online] "Using Javascript postMessage to Talk to iFrames," Tony Pitale, Jul. 5, 2011 [retrieved on May 31, 2017] Retrieved from Internet: URL<https://www.viget.com/articles/using-javascript-postmessage-to-talk-to-iframes> 6 pages.

International Search Report and Written Opinion issued in International Application No. PCT/US2018/022451, dated Jun. 6, 2018, 16 pages.

\* cited by examiner

CROSS-ORIGIN COMMUNICATION IN RESTRICTED COMPUTER ENVIRONMENTS

TECHNICAL FIELD

This document generally relates to techniques for communicating between separate execution contexts on a computing system, such as between different windows in a web browser.

BACKGROUND

Advancements in hardware and software capabilities of servers and computing devices alike have led to increasingly sophisticated web pages, application interfaces, and other electronic documents. Some web pages, for instance, integrate content from multiple sources to provide a comprehensive user experience. By way of example, a web page may include a top-level document that provides primary content for the web page and one or more iFrames that embed other content in the top-level document. In some cases, embedded documents are obtained from a different domain than a domain from which their top-level document was obtained, and thus are said to have different origins.

Documents from different origins can pose a security threat to computing systems. For example, a document from a first origin may carry malicious programs that are designed to compromise a document from a second origin, e.g., by injecting further malicious code in the other document, by inspecting or making unauthorized changes to a document object model (DOM) of the other document, scraping personal information from the other document, or monitoring user interactions with the other document. As such, web browsers and other applications that commonly execute documents from different origins have implemented same-origin policies that restrict many forms of cross-origin document interaction. For instance, a browser may prevent a web page from a first domain that is displayed in a first window from accessing data associated with another web page from a second domain that is displayed in a second window. Same-origin policies have been developed to protect the integrity and confidentiality of data from different sources.

SUMMARY

This document describes computer-based systems, methods, devices, and other techniques for providing a secure communication channel between cross-origin execution contexts. In some implementations, a bi-directional communication channel between cross-origin execution contexts can be applied to create a unified user interface for a top-level document, such as a primary web page, and one or more embedded documents that contain secondary content displayed in one or more iFrames nested in the primary web page.

Some implementations of the subject matter disclosed herein include a computer-implemented method for communicating data between a first execution context on a computing system and a second execution context on the computing system. The first execution context can execute content from a first origin, the second execution context can execute content from a second origin that is different from the first origin, and the first execution context and the second execution context can each be restricted from accessing data of the other as a result of a same-origin policy implemented by the computing system. The method can include establishing a bi-directional communication channel between the first execution context and the second execution context, including: receiving, in the first execution context, an initial discovery message that was transmitted from the second execution context; determining, in the first execution context and based on the initial discovery message that was transmitted from the second execution context, an identifier of the second execution context; establishing, using the identifier of the second execution context, a first uni-directional sub-channel of the bi-directional communication channel, the first uni-directional sub-channel configured to carry messages from the first execution context to the second execution context; receiving, in the second execution context, a connection broadcast message that was transmitted from the first execution context over the first uni-directional sub-channel; determining, in the second execution context and based on the connection broadcast message that was transmitted from the first execution context over the first uni-directional sub-channel, an identifier of the first execution context; and establishing, using the identifier of the first execution context, a second uni-directional sub-channel of the bi-directional communication channel, the second uni-directional sub-channel configured to carry messages from the second execution context to the first execution context; and communicating messages between the first execution context and the second execution context over the bi-directional communication channel.

These and other implementations can optionally include one or more of the following features.

In accordance with the same-origin policy, the computing system can classify the second origin as being different from the first origin in response to identifying that at least one of transmission protocols, addresses, or port numbers of the first origin and the second origin differ from each other.

The first execution context can include a first window object configured to present the content from the first origin, wherein the second execution context includes a second window object configured to present the content from the second origin.

The content presented in the first window object can include a first web page that is hosted by one or more servers at a first domain associated with the first origin. The content presented in the second window object can include a second web page that is hosted by one or more servers at a second domain associated with the second origin. The second window object can be an inline frame (iFrame) that is embedded in the first web page.

Operations can further include generating the first execution context and the second execution context with a web browsing application of the computing system, wherein the first uni-directional sub-channel is configured to carry messages from the first execution context to the second execution context using a postMessage application programming interface (API) of the web browsing application, and wherein the second uni-directional sub-channel is configured to carry messages from the second execution context to the first execution context using the postMessage API of the web browsing application.

The second execution context can be a descendant of the first execution context in a hierarchy of execution contexts on the computing system. Determining, in the first execution context and based on the initial discovery message that was transmitted from the second execution context, the identifier of the second execution context can include accessing a value of a source identifier field of the initial discovery message.

After establishing the first and second uni-directional sub-channels, the bi-directional communication channel can be validated by: transmitting, from the second execution context and to the first execution context, a first channel connection message; receiving, in the first execution context, the first channel connection message transmitted from the second execution context; in response to receiving the first channel connection message, marking the bi-directional communication channel as being in a connected state at the first execution context; transmitting, from the first execution context and to the second execution context, a second channel connection message; receiving, in the second execution context, the second channel connection message transmitted from the first execution context; and in response to receiving the second channel connection message, marking the bi-directional communication channel as being in the connected state at the second execution context.

One or more services in the first execution context can be configured to use the bi-directional communication channel to carry messages from the first execution context to the second execution context in response to identifying that the first uni-directional sub-channel is in the connected state. The one or more services in the first execution context can be configured to perform alternative actions rather than using the bi-directional communication channel to carry messages from the first execution context to the second execution context in response to identifying that the first-uni-directional sub-channel is in an unconnected state.

Operations can further include determining, in the first execution context, whether the first execution context was a target of the initial discovery message from the second execution context by checking whether the second execution context is a descendant of the first execution context in a hierarchy of execution contexts on the computing system; and in response to identifying that the second execution context is a descendant of the first execution context: (i) determining that the first execution context was the target of the initial discovery message from the second execution context and proceeding to establish the first uni-directional sub-channel, and (ii) selecting to establish the first uni-directional sub-channel between the first execution context and the second execution context.

Operations can further include receiving, in the first execution context, a second initial discovery message that was transmitted from a third execution context that executes content from an origin other than the first origin, wherein the first execution context and the third execution context are each restricted from accessing data of the other as a result of the same-origin policy implemented by the computing system; determining, in the first execution context, whether the first execution context was a target of the second initial discovery message from the third execution context by checking whether the third execution context is a descendant of the first execution context in a hierarchy of execution contexts on the computing system; and in response to identifying that the third execution context is not a descendant of the first execution context, discarding the second initial discovery message so as to not establish a communication channel between the first execution context and the third execution context.

Operations can further include identifying, in the first execution context, that the initial discovery message from the second execution context contains a first token that indicates the initial discovery message is to initiate establishment of a first channel between the first execution context and a first service of the second execution context; receiving, in the first execution context, a second initial discovery message that was transmitted from the second execution context; identifying, in the first execution context, that the second initial discovery message from the second execution context contains a second token that indicates the second initial discovery message is to initiate establishment of a second channel between the first execution context and a second service of the second execution context that is different from the first service of the second execution context.

Operations can include, after establishing the bi-directional communication channel between the first execution context and the second execution context: identifying a user interaction with a control element displayed within a presentation of the first execution context; and in response to identifying the user interaction with the control element displayed within the presentation of the first execution context, transmitting, over the bi-directional communication channel from the first execution context and to the second execution context, an indication of the user interaction with the control element displayed within the presentation of the first execution context.

The user interaction with the control element displayed within the presentation of the first execution context indicates an instruction to hide or close a presentation of the content executed by the second execution context.

Some implementations of the subject matter disclosed herein include one or more computer-readable media storing instructions that, when executed by one or more processors, cause the one or more processors to perform the foregoing method and operations.

Some implementations of the subject matter disclosed herein include a computing system that includes one or more processors and the one or more computer-readable media.

Some implementations of the subject matter disclosed herein include a computing system having one or more processors and one or more computer-readable media encoded with instructions that, when executed, cause the one or more processors to implement: a first execution context that executes content from a first origin; a second execution context that executes content from a second origin that is different from the first origin; and a security application that restricts each of the first execution context and the second execution context from accessing data of the other in accordance with a same-origin policy implemented by the security application. The first execution context and the second execution context are configured to establish a bi-directional communication channel for carrying messages between the first execution context and the second execution context by performing operations that include: receiving, in the first execution context, an initial discovery message that was transmitted from the second execution context; determining, in the first execution context and based on the initial discovery message that was transmitted from the second execution context, an identifier of the second execution context; establishing, using the identifier of the second execution context, a first uni-directional sub-channel of the bi-directional communication channel, the first uni-directional sub-channel configured to carry messages from the first execution context to the second execution context; receiving, in the second execution context, a connection broadcast message that was transmitted from the first execution context over the first uni-directional sub-channel; determining, in the second execution context and based on the connection broadcast message that was transmitted from the first execution context over the first uni-directional sub-channel, an identifier of the first execution context; and establishing, using the identifier of the first execution context, a second uni-directional sub-channel of the bi-directional communication channel, the second uni-directional sub-channel configured to carry messages from the second execution context to the first execution context.

Implementations of the subject matter disclosed herein may, in certain instances, realize one or more of the following advantages. A communication channel can be established that facilitates cross-origin communication between execution contexts in a computer environment without circumventing the security requirements of a same-origin. The channel can be established and verified to ensure that the channel can be reliably used by one or more services. In some implementations, the communication afforded by a cross-origin communication channel can allow two or more execution contexts to provide a unified interface in which events that occur in one context can trigger or affect events in one or more other contexts, even if the execution contexts are associated with different origins. For example, a first portion of a user interface may be presented in an iFrame of a web page, and one or more controls in the top level web page may be selected by a user to invoke a response within the iFrame. In some implementations, the techniques for establishing a communication channel disclosed herein allow cross-origin execution contexts to discover each other so that the endpoints of the channel can be defined. Additional features and advantages will be recognized by persons of ordinary skill in the art in light of the entire disclosure.

DESCRIPTION OF DRAWINGS

Like reference symbols in the various drawings indicate like elements.

DETAILED DESCRIPTION

This document describes computer-based systems, methods, devices, and other techniques for establishing communication between cross-origin execution contexts. In some implementations, the techniques can be applied to establish bi-directional communication between a primary web page and a secondary web page embedded in the primary web page via an inline frame (iFrame), even when the primary and secondary web pages have different origins. Once a bi-directional communication channel is established, scripts in the two web pages may leverage the channel to implement a range of services that cross the origin divide. For example, when a user clicks on an element in a primary web page, a script from the primary page may alert an execution context for the secondary page of the clicking event. A handler script from the secondary page may then perform a programmed routine in response to the clicking event. As such, the bi-directional communication channel between cross-origin execution contexts may facilitate a seamless user experience so that the embedded content appears to the user as if it is truly part of the primary web page, rather than embedded in a separate container.

In general, an execution context is a dedicated computing process for executing a particular content item, such as a script, a web page, a worksheet, or another document. A system may create a respective execution context for each window that is opened in an application, where each window presents a different content item. The system (e.g., an operating system or an application on the computing system), may maintain execution contexts separately from each other so that events that occur in one execution context do not affect other, concurrently running execution contexts. For example, when a user refreshes a first web page having a first execution context, the refresh event may have no direct impact on other web pages open within the same browser because they are maintained in separate execution contexts. Moreover, for computing systems that enforce a same-origin policy, execution contexts for content items from different origins may be further restricted from interacting with each other. While a system may permit scripts in execution contexts for content items having the same origin to interact with and freely access data managed by each other, the same-origin policy may restrict scripts from cross-origin execution contexts from similarly interacting with or accessing data managed by each other.

Figure 1:
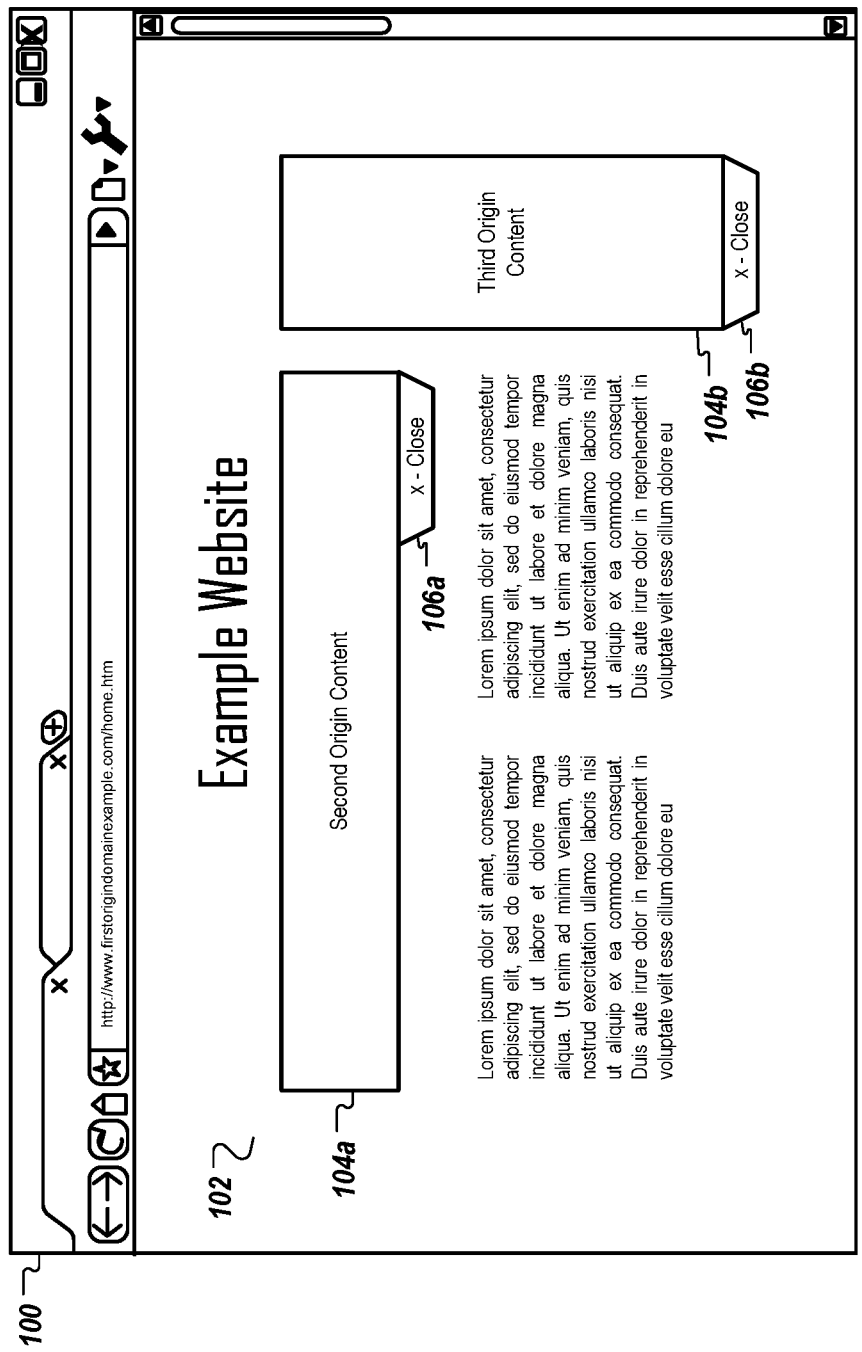
FIG. 1 depicts an example web page having embedded content frames presented in a window of a web browsing application.

Referring now to FIG. 1, an illustration is shown of an example web page 102 presented in a window 100 of a web browsing application. The web page 102 includes various pieces of primary content such as the headline "Example Website" and columns of text. The web page 102 is from a first origin, where the first origin is represented at least in part by the universal resource locator (URL) of the web page 102, http://www.firstorigindomainexample.com/home.htm. In some implementations, an origin is defined by a tuple of information including (i) URI scheme or protocol (e.g., http vs. ftp vs. https), (ii) hostname, and (iii) port. If any piece of information in two tuples do not match, then the origins defined by the tuples are deemed to be different.

The primary content of web page 102 may be executed by the browser in a dedicated execution process. Because the web page 102 is presented in a browser window 100, the execution process for the primary web page 102 also corresponds to the window 100 in which the web page 102 is presented.

In addition to the primary content of web page 102, the web page 102 also includes embedded content frames 104a and 104b. The first embedded content frame 104a presents secondary content from a second origin and the second embedded content frame 104b presents secondary content obtained from a third origin. In some implementations, the content frames 104a and 104b are each defined by one or more iFrames, and each iFrame may be provided its own execution context. The architecture of an example embedded content frame like content frames 104a and 104b is described in further detail with respect to FIG. 2. As a result of a same-origin policy enforced by the web browser application and the different origins of the top-level web page 102 and the content presented in the embedded content frames 104a and 104b, the respective execution contexts of the web page 102 and the embedded content may be restricted from certain interactions with each other and/or from accessing each other's data. The data associated with a document (or an execution context for the document) may include, for example, a document object model (DOM) for the document, indications of user interactions with the document, document properties, or a combination of these and other data. For example, a script in a first web page from a first origin may be permitted to inspect and modify a DOM of a second web page from the same origin, or to set a listener for events that occur in the second web page. In contrast, as a result of the same-origin policy, a script in a first web page from a first origin may be blocked from inspecting or modifying the DOM of a second web page from a different origin, or from setting a listener for events that occur in the second web page.

In some implementations, a content frame for presenting secondary content can be embedded in a top-level web page by injecting a script or other computer code into the top-level page which, when executed, causes the browser to dynamically insert the frame into the web page and to request one or more secondary content items to present in the frame. The secondary content items may be retrieved from a different origin than that of the top-level web page. For example, the top-level web page 102 may be obtained from a first web domain (e.g., a first origin) for a publisher that has agreed to display secondary content from a content-providing network. A script in the first embedded content frame 104a may then call the content-providing network to obtain a secondary content item (e.g., an advertisement) to display within the frame 104a. Similarly, a script in the second embedded content frame 104b may also call the content-providing network to retrieve another secondary content item to display in the frame 104b.

In some implementations, a bi-directional communication channel can be established between execution contexts associated with different origins. Details of how such a channel may can be established are described with respect to FIGS. 4-7. Advantageously, a bi-directional communication channel can permit scripts from cross-origin execution contexts to transmit messages between each other and to implement a range of run-time services that involve cross-origin interactions. For instance, an event listener can be set in a first execution context. When the event listener detects an occurrence of a prescribed event, the listener may call a handler that uses the bi-directional channel to alert a second execution context of the occurrence of the event. A listener in the second execution context may then handle the notification in any appropriate way, including sending acknowledgements and further messages back to the first execution context over the bi-directional channel.

In some implementations, a bi-directional communication channel can be used to create a unified user interface between cross-origin execution contexts such as a top-level web page 102 and embedded content frames 104a and 104b. Based on messages transmitted over the bi-directional channel, the top-level web page 102 may respond to events in the embedded content frames 104a or 104b, and vice versa. For example, the top-level web page 102 may include user interface elements 106a and 106b. The elements 106a and 106b are displayed adjacent to, but outside of, their corresponding embedded content frames 104a and 104b, respectively. Because the elements 106a and 106b are provided in the top-level page 102 and are external to the embedded content frames 104a and 104b, the browser's same-origin policy may typically restrict those elements from controlling actions within the embedded frames 104a and 104b. However, once a bi-directional communication channel is established between cross-origin execution contexts according to the techniques disclosed herein, interactions with the elements 106a or 106b in the top-level web page 102 may trigger responses within the embedded content frames 104a or 104b, respectively.

For example, a listener may be set in the top-level web page 102 to identify when a user has selected (e.g., clicked on) element 106a. When a selection of element 106a is detected, a handler script in the top-level web page 102 may transmit a message over a previously established bi-directional communication channel, which is then detected by a listener in the embedded content frame 104a. A handler script from the embedded content frame 104a may then perform one or more operations responsive to the user's selection of element 106a, e.g., closing the content frame 104a, updating the content displayed in content frame 104a, playing or pausing a media item in content frame 104a, generating a survey for the user that solicits questions about content that was recently displayed in content frame 104a, requesting additional information about a state of the top-level web page 102, providing instructions to the top-level web page 102 to perform an action (e.g., closing content frame 104a from the top-level web page 102, generating a new embedded content frame or pop-up window), or a combination of these and other operations.

In some implementations, the techniques disclosed herein can be carried out to establish a bi-directional communication channel between cross-origin execution contexts outside of a web browser environment. For example, any two windows or user interfaces of an application or an operating system on a computing device which are maintained in separate execution contexts associated with different origins may establish a bi-directional communication channel according to the techniques disclosed herein.

Figure 2:
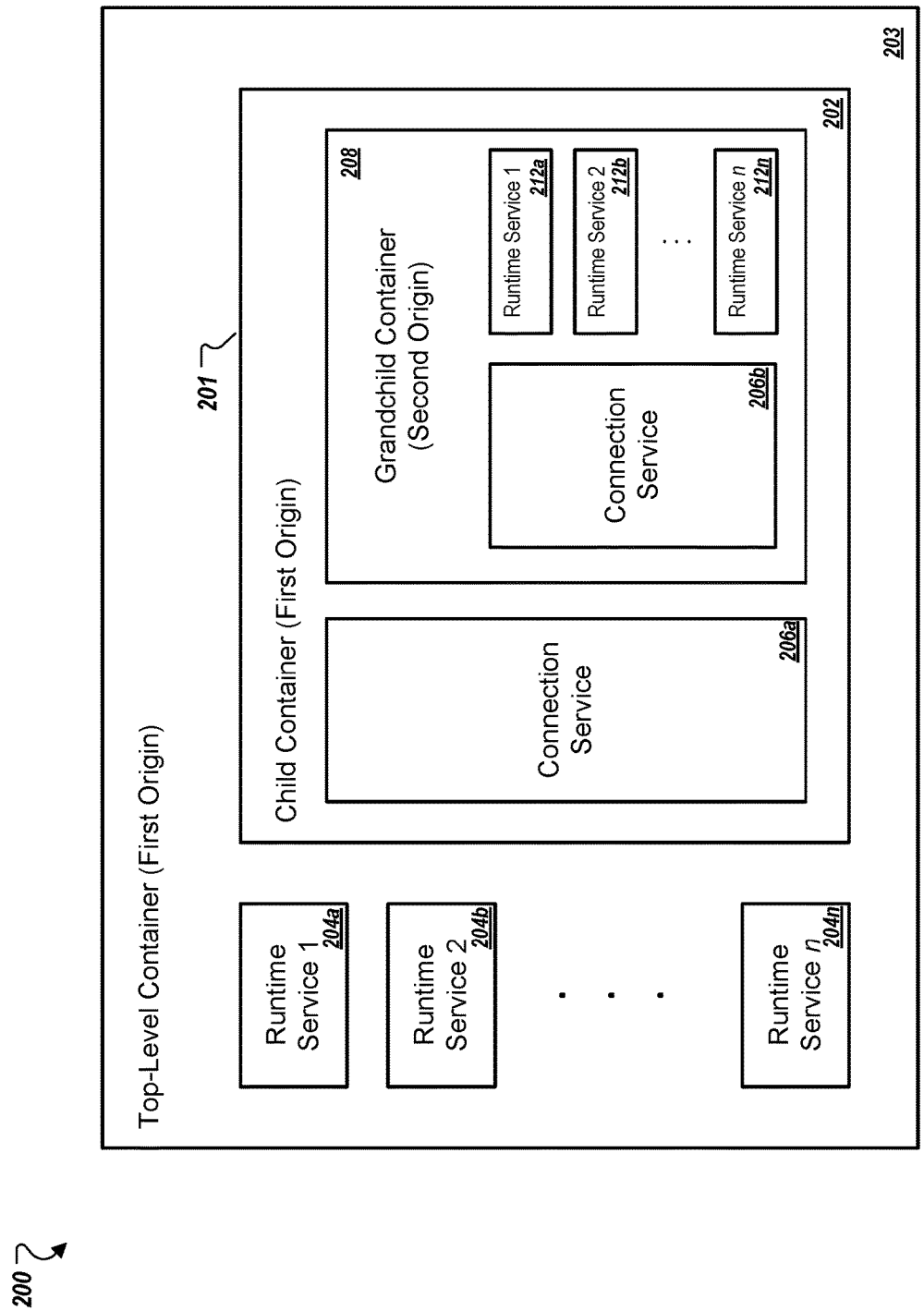
FIG. 2 depicts a block diagram of an example document and an embedded content frame.

FIG. 2 depicts a block diagram of an example document 200 and an embedded content frame 201. The document 200 may be a web page or an interface of a native application on a computing device, for example. In some implementations, the document 200 is formed from a hierarchy of content items, where at least some of the items have different origins. For example, a publisher's website may include a top-level page that displays primary content from the publisher, and one or more descendant content items lower in the hierarchy that display secondary content from third-party content providers. The descendant content items can be provided in embedded content frames, for example.

The document 200 can be executed by an application (e.g., a web browser) on a computing device. In some implementations, the application presents individual content items, or groups of content items, from the hierarchy of items for the document 200 in containers. A container may be a window object, for example, such as a tab in a web browser or an iFrame embedded in a higher-level content item. When the document 200 is executed, the application creates a respective execution context for each container, where the execution context for a given container executes the corresponding content item presented in the container. For example, a top-level web page may be presented in the main window of a browsing application while embedded content items may be presented in iFrames nested within the main window of the application. The browser may create a first execution context for the top-level web page presented in the main window, a second execution context for a child content item embedded in the top-level page and presented in an outer iFrame, and a third execution context for a grandchild content item embedded in the child content item and presented in an inner iFrame nested within the outer iFrame.

As shown in FIG. 2, the example document 200 includes a series of nested containers. A top-level container 203 presents a primary content item of the document 200. The embedded content frame 201 then includes two lower-order containers for content items beneath the primary item in a hierarchy. For example, the embedded content frame 201 includes a child container 202 that is nested directly within the top-level container 203. The child container 202 then further includes a grandchild container 208 that is nested directly within the child container 202. In some implementations, the primary content item includes a script that, when executed, instantiates the child container 202. After the child container 202 is instantiated, a script within the child content item presented in child container 202 is executed, which in turn instantiates the grandchild container 208.

In some implementations, the existence of nested containers within embedded content frame 201 may be hidden from a user when the document 200 is displayed. For example, a display area of the grandchild container 208 may span the entire display area of the child container 202. Further, the child container 202 and grandchild container 208 may include no visible borders, so that any content item presented in the grandchild container 208 appears as if it is seamlessly integrated into the presentation of the top-level content item. Although content in the child container 202 (other than the grandchild container 208) may not be visible, its existence may be utilized to facilitate communication between execution contexts for the grandchild container 208 and the top-level container 203. The child container 202 may also include scripts that, for example, facilitate creation of the grandchild container 208 and/or facilitate selection of content for presentation in the grandchild container 208. In some implementations, as described in further detail with respect to FIG. 5, the child container 202 can facilitate establishment of a bi-directional communication channel between cross-origin execution contexts of the top-level container 203 and the grandchild container 208 due to its familial relationship as an ancestor (parent) of the grandchild container 208, and further due to its association with a same origin as the top-level container 203 but a different origin than the grandchild container 208.

In some implementations, the document 200 includes scripts (or other executable code) that, when executed, implement one or more services to carry out various tasks defined by the document 200. Some services are asynchronous and perform operations for a task upon detecting that a specified event has occurred. The script for an asynchronous service may include, for example, one or more listener modules and one or more handler modules to listen for and handle detected events. Some services are performed synchronously, e.g., as part of a routine when the document 200 is initially loaded. In some implementations, the document 200 can include connection services 206a-206b that are configured to carry out operations to establish a bi-directional communication channel, e.g., between cross-origin execution contexts for the top-level container 203 and the grandchild container 208. The operations carried out by connection services 206a-206b are discussed in further detail with respect to FIGS. 4-7. A first component of the connection service 206a can be provided by a script in the child container 202, while a second component of the connection service 206b can be provided by a script in the grandchild container 208. Additionally, the document 200 may include one or more runtime services 204a-n, 212a-n that carry out other tasks such as tasks that involve interactions between cross-origin execution contexts using a bi-directional communication channel established by connection services 206a-206b.

Figure 3:
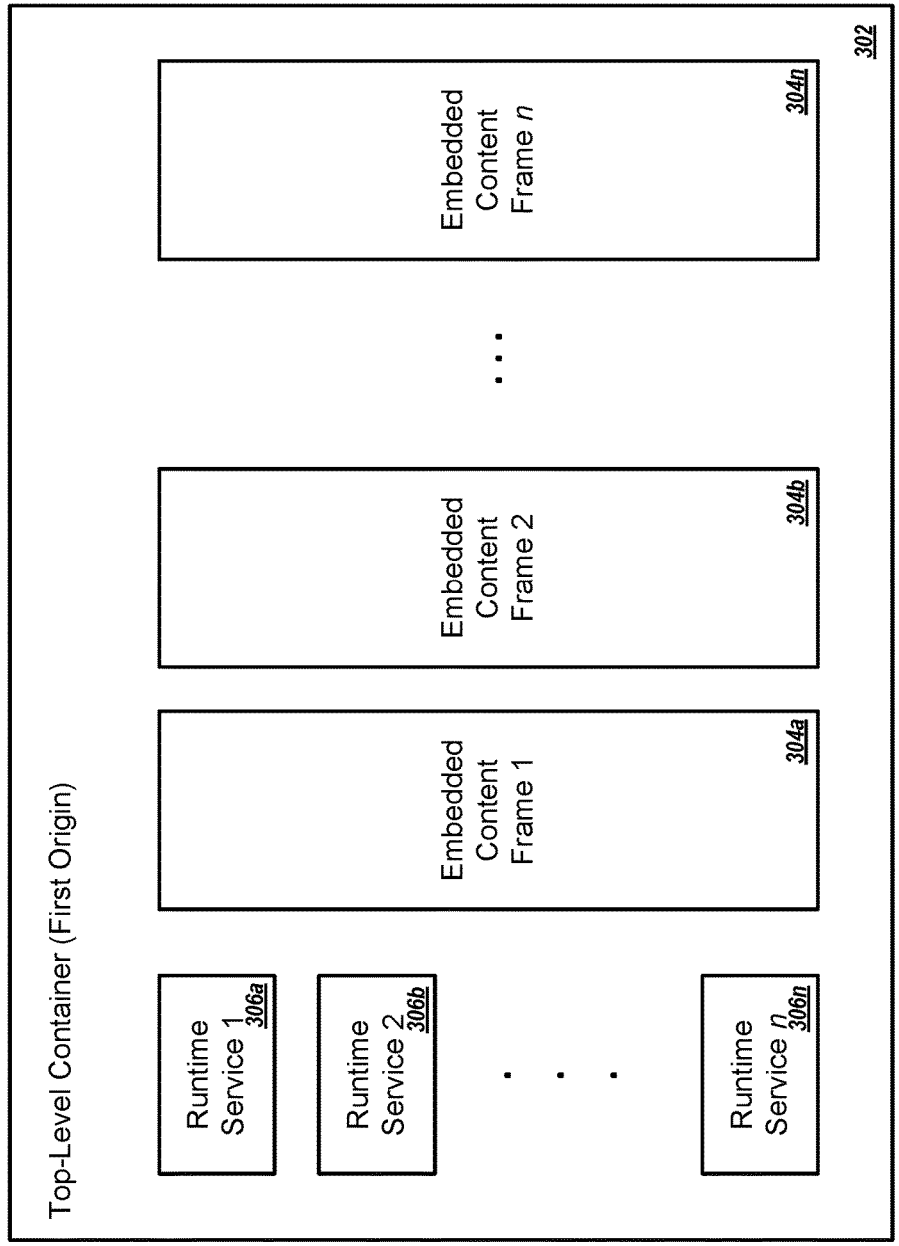
FIG. 3 depicts a block diagram of a document that includes multiple embedded content frames.

FIG. 3 is a block diagram of a document 300 that includes multiple embedded content frames 304a-n. Like document 200 (FIG. 2), the document 300 shown in FIG. 3 can include a set of runtime services 306a-n and embedded content. Unlike document 200, however, document 300 includes multiple embedded content frames 304a-n, e.g., to present multiple secondary content items from one or more origins. Each embedded content frame 304a-n may include one, two, three, four, or more nested content containers. In some implementations, all or some of the embedded content frames 304a-n are structured like the example embedded content frame 201 of FIG. 2. For example, a given one of the embedded content frames 304a-n may include one or more nested outer containers (where the outermost of the outer containers is a first-generation descendant of the top-level container such as child container 202) and an inner container such as grandchild container 208. Each embedded content frame 304a-n may also include scripts configured to implement a connection service to establish bi-directional communications between cross-origin execution contexts. In some implementations, the execution contexts for each of the containers in document 300 can be represented in a hierarchy that corresponds to the hierarchical arrangement of the containers.

Figure 4:
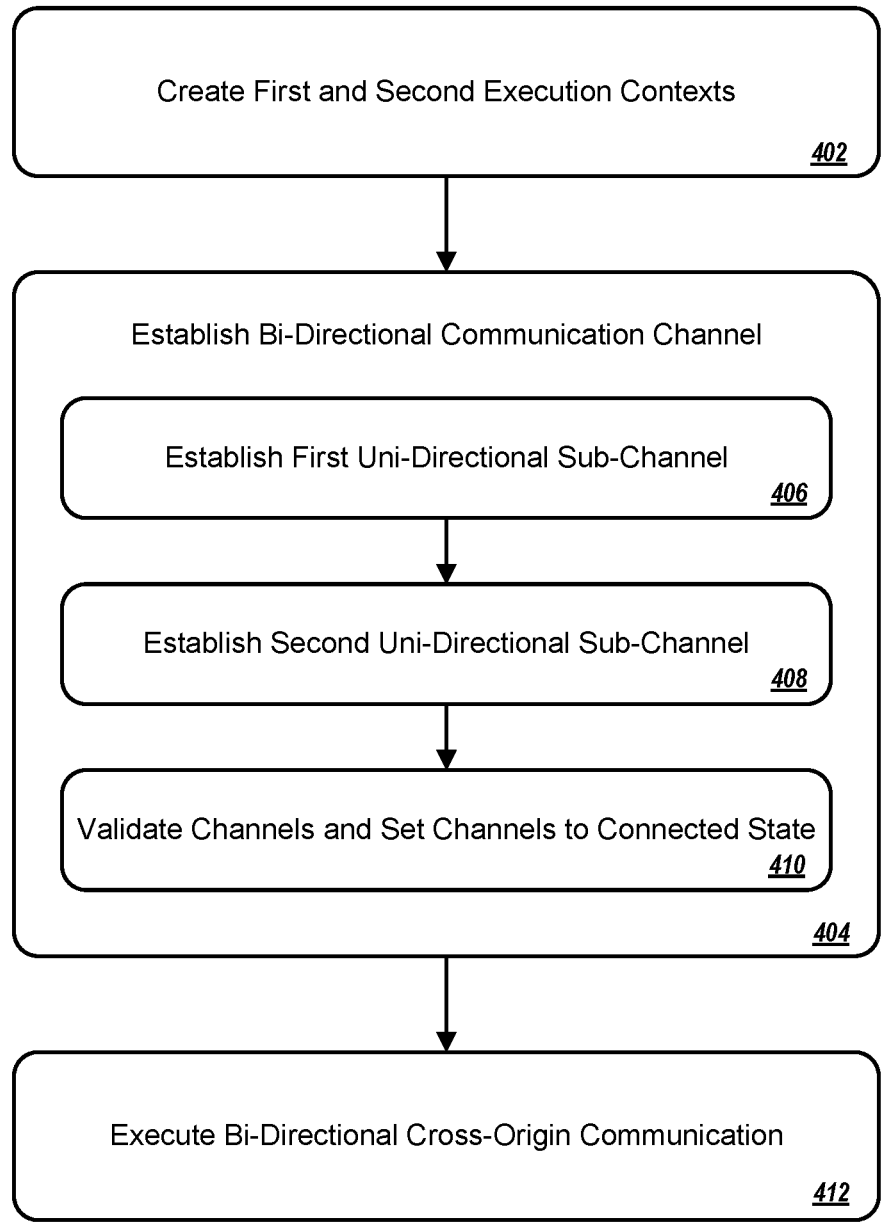
FIG. 4 depicts a flowchart of an example process for creating and using a bi-directional communication channel among cross-origin execution contexts in an environment that enforces a same-origin policy.

Turning to FIG. 4, a flowchart is shown of an example process 400 for creating and using a bi-directional communication channel among cross-origin execution contexts in an environment that enforces a same-origin policy. Further detail of the operations for establishing the channel are described with respect to FIGS. 5-7.

At stage 402, a computing system (e.g., a desktop computer, a notebook computer, a mobile computing device, or a wearable computing device) creates a first and second execution context. In some implementations, the first and second execution contexts each correspond to a different container in a document or other interface configured to present content items from different origins. By way of example, this discussion will consider that the computing system has created the first execution context to execute content from a first origin, which is presented in an outer container of an embedded content frame (e.g., child container 202). A top-level container of the document in which the content frame is embedded also includes content from the first origin, and thus the execution contexts of the top-level container and the outer container are the same. Accordingly, the same-origin policy permits these execution contexts relative freedom of interaction and access to each other's restricted data. In contrast, the second execution context in this example executes content from a second origin, which content is presented in an inner container of the embedded content frame (e.g., grandchild container 208).

At stage 404, the system executes a connection service to establish a bi-directional communication channel between an execution context of the first origin and an execution context of the second origin. For example, the communication channel may directly connect the first execution context and/or a top-level execution context associated with the first origin to the second execution context associated with the second origin.

To generate the bi-directional communication channel, the system may perform operations in several sub-stages 406-410. At sub-stage 406, a first uni-directional sub-channel is established between the first and second execution contexts. The first uni-directional sub-channel runs from the first execution context to the second execution context and is configured to carry messages from the first execution context to the second execution context. At sub-stage 408, a second uni-directional sub-channel is established between the second and first execution contexts. The second uni-directional sub-channel runs from the second execution context to the first execution context and is configured to carry messages from the second execution context to the first execution context. Together, the first and second sub-channels form the bi-directional communication channel, where each of the sub-channels defines a target endpoint for bi-directional communication.

In some implementations, the connection services of the first and second execution contexts can utilize a primitive but secure cross-origin messaging protocol to transmit messages between the respective execution contexts during the process of establishing the communication channel. The messaging protocol may be exposed to the connection services by an application programming interface (API) of an operating system or application in which the first and second execution contexts are run. For example, some web browsers include a postMessage( ) function that defines a capability to asynchronously transmit messages from one execution context to another, even when they are otherwise restricted from interacting with each other under a same-origin policy. An execution context may listen for a postMessage transmitted to it, and may either select to process the detected message or not. The postMessage( ) protocol is designed such that a transmitted postMessage is not automatically processed by a recipient execution process, although it can be processed if the recipient is expecting the message and the recipient execution process has provided appropriate scripts (e.g., a listener and a handler) to detect and process any postMessages transmitted to it. However, the postMessage( ) protocol does not by itself provide bi-directional communications or provide for discovery of other execution contexts in a given document or interface. The operations disclosed in further detail with respect to FIGS. 5-7, for example, may in certain instances at least partially address these deficiencies of the postMessage( ) protocol.

When the first and second uni-directional sub-channels are initially established, they may initially be set to an unconnected (non-operational) status. When the sub-channels, and hence the bi-directional channel, are in the unconnected state, external services (e.g., run-time services) may be blocked from using the channel because it is not yet confirmed that messages can be successfully delivered to the respective recipient execution contexts. Therefore, at stage 410, the system validates the bi-directional communication channel to confirm its operational status. If the channel, including the first and second sub-channels, are validated, then the system sets the status of the channel, including the first and second sub-channels, to the connected state (operational state). Otherwise, the status of the channel remains unconnected.

At stage 412, after establishing and validating the bi-directional communication channel, services may use the channel to carry messages between cross-origin execution contexts. The services may use the channel to send requests for information about restricted data from the first execution context to the second execution context (or vice versa), to notify one of the execution channels of an occurrence of an event in the other, to inspect some part of the DOM of the other execution context, to modify a portion of the DOM of the other execution context, and/or to perform combinations of these operations and other operations.

Figure 5:
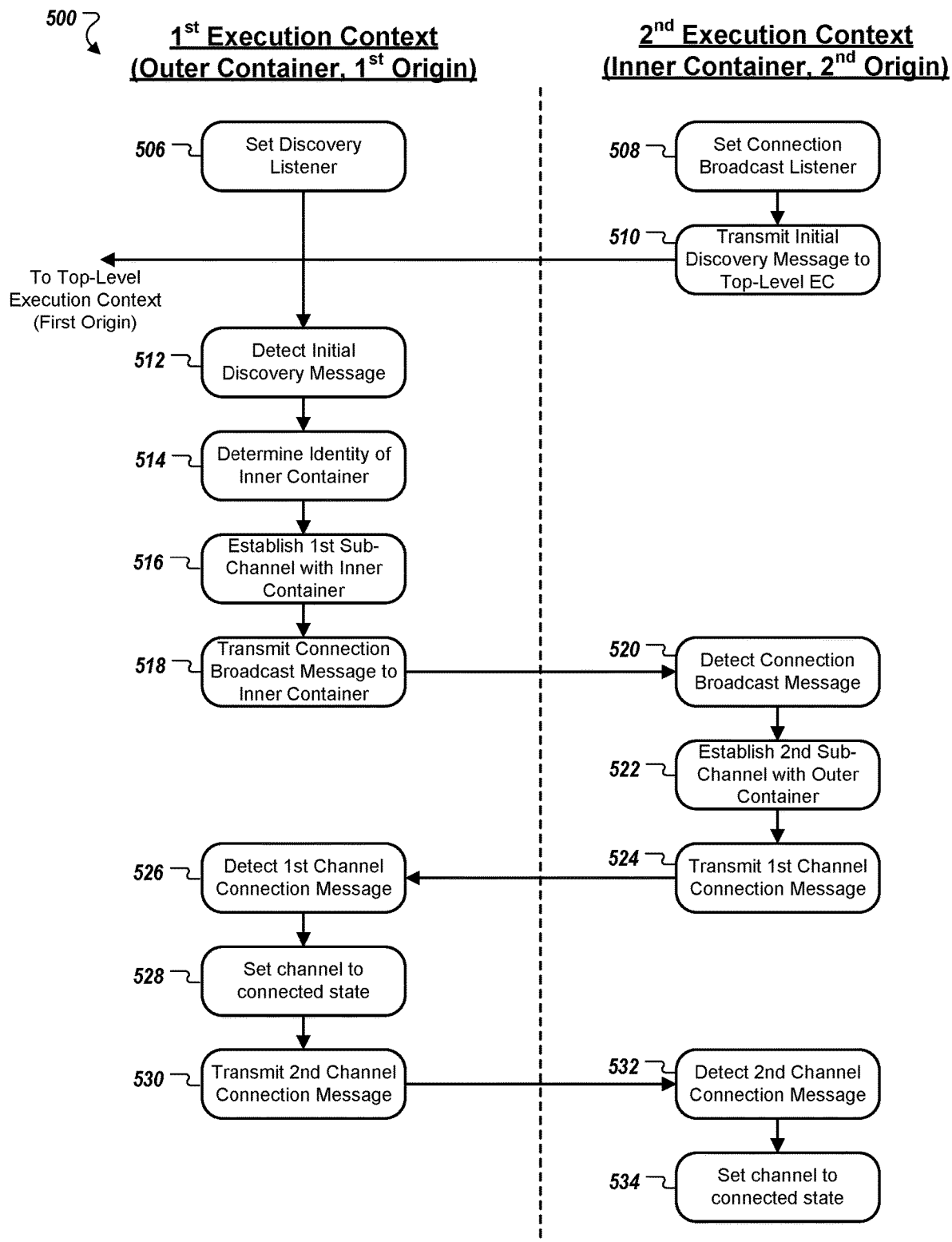
FIG. 5 depicts a swim-lane diagram of an example process for establishing a bi-directional communication channel between cross-origin execution contexts.

FIG. 5 is a swim-lane diagram of an example process 500 for establishing a bi-directional communication channel between cross-origin execution contexts. The process 500 can be carried out by a computing system having one or more computers in one or more locations, in which the computing system has instantiated a first execution context for executing content from a first origin and a second execution context for executing content from a second origin. In the example of FIG. 5, the first execution context corresponds to an outer container, e.g., container 202 (FIG. 2), and the second execution context corresponds to an inner container nested within the outer container, e.g., container 208 (FIG. 2). In particular, the operations performed by the first execution context for the outer container may be carried out by one or more scripts that provide a connection service of the first execution context. Similarly, the operations performed by the second execution context for the inner container may be carried out by one or more scripts that provide a connection service of the second execution context. Further, the outer container may be embedded in a top-level container, e.g., container 203. The top-level container may present content that is also from the first origin. The system may enforce a same-origin policy to restrict interactions between the first and second execution contexts as a result of their differing origins, but may permit such interactions between the first execution context and an execution context of the top-level container due to their common origin.

At stage 506, the first execution context sets a listener in the top-level execution context for a discovery message. The connection service of the first execution context is capable of setting the listener in the top-level execution context under the same-origin policy because they share the same origin. Notably, the connection service of the first execution context sets the listener in the top-level execution context rather than in the first execution context because the second execution context is not initially aware of the first execution context due to restrictions of the same-origin policy. As such, the second execution context is unable to initially target the first execution context as the intended recipient of the discovery message, even though it is possible to indicate that a message should be transmitted to the top-level container where the discovery listener is set.

At stage 508, the second execution context sets a listener in the second execution context for a connection broadcast message. The connection broadcast message is described further with respect to stages 518 and 520.

At stage 510, the second execution context transmits a discovery message to the top-level container. In some implementations, discovery message is sent using the postMessage( ) protocol. The discovery message is a type of message that the first execution context is configured to recognize as a message to initiate a connection routine for establishing a bi-directional communication channel.

At stage 512, the first execution context detects the discovery message that was transmitted from the second execution context. The discovery message is detected using the discovery listener that was set at stage 506.

At stage 514, the first execution context analyzes the discovery message to determine the source of the message. In some implementations, the first execution context determines the source of the discovery message by accessing a value of a source field of the message. The value can be a unique identifier of the second execution context. The discovery message sent to the top-level execution context thereby permits the first execution context to determine the existence of, and to identity, the second execution context.

At stage 516, the first execution context establishes a first uni-directional sub-channel between the first execution context and the second execution context. The first uni-directional sub-channel identifies, based on the unique identifier accessed from the discovery message, the second execution context as one endpoint of the bi-directional communication channel. The first uni-directional sub-channel can be used to transmit messages from the first execution context to the second execution context.

At stage 518, the first execution context transmits a connection broadcast message to the second execution context using the first uni-directional sub-channel. In some implementations, transmitting the connection broadcast message involves transmitting a message to the second execution context using the postMessage( ) protocol and using the identifier of the second execution context that was obtained from the discovery message as the intended recipient of the connection broadcast message. The connection broadcast message is a type of message that the second execution context is configured to recognize as a response to the discovery message.

At stage 520, the second execution context detects the connection broadcast message that was transmitted from the first execution context. The connection broadcast message is detected using the connection broadcast listener that was set at stage 508.

Upon detecting the connection broadcast message, the second execution context analyzes the message to determine its source. In some implementations, the second execution context determines the source of the connection broadcast message by accessing a value of a source field of the message. The value can be a unique identifier of the first execution context. The connection broadcast message sent to the second execution context thereby permits the second execution context to determine the existence of, and to identity, the first execution context.

At stage 522, the second execution context establishes a second uni-directional sub-channel between the second execution context and the first execution context. The second uni-directional sub-channel identifies, based on the unique identifier accessed from the connection broadcast message, the first execution context as a second endpoint of the bi-directional communication channel. The second uni-directional sub-channel can be used to transmit messages from the second execution context to the first execution context.

With the first and second uni-directional sub-channels established, the bi-directional communication channel is also established, since the pair of sub-channels are sufficient to provide bi-directional communication between the first and second execution contexts. However, in some implementations, a status of the bi-directional communication channel may initially be set to unconnected. In the unconnected state, the bi-directional communication channel may be unavailable for use by services other than the connection service because operation of the channel has not yet been validated. Services may be configured to check the status of the channel before use. If the channel is connected, then an external service may use it to transmit messages across cross-origin execution contexts. If the channel is unconnected, then the external service may not yet use the channel.

The validation process to bring the channel to a connected state, can begin at stage 524, where the second execution context transmits a first channel connection message to the first execution context using the second sub-channel of the bi-directional communication channel. The channel connection message is a message that instructs the recipient execution context to set the status of the bi-directional communication channel to the connected state. In some implementations, the channel connection message (and any other messages exchanged between the first and second execution contexts) may be transmitted using the postMessage( ) protocol. The first execution context may have set a listener in the first execution context for the first connection message (e.g., after establishing the first sub-channel). When the listener detects the first connection message from the second execution context (stage 526), the first execution context sets the bi-directional communication channel to the connected state (stage 528). However, the state of the channel is independently maintained at each of the first and second execution contexts. Therefore, at stage 530, the first execution context transmits a second channel connection message to the second execution process. The second execution context may have set a listener in the second execution context for the second connection message (e.g., after establishing the second sub-channel). When the listener detects the second connection message from the first execution context (stage 532), the second execution context also transitions the bi-directional communication channel from the unconnected state to the connected state. With the endpoints activated and the state of the channel set to connected in both the first and second execution contexts, the bi-directional channel can be properly used by one or more services in execution contexts associated with the first and second origins.

As described with respect to FIG. 3, some documents or interfaces can include multiple embedded content frames, e.g., frames 304*a-n*. For such documents, each embedded content frame may have need to establish its own bi-directional communication channel to permit communication between execution contexts for an outer container of the embedded content frame (e.g., container 202) and an inner container of the embedded content frame (e.g., container 208). One challenge entailed in establishing a respective bi-directional channel for each embedded content frame is that the initial discovery messages transmitted to the execution context for the top-level container can all be heard by each of the discovery message listeners set by the execution contexts for the outer containers of all the embedded content frames. To prevent every execution context from responding to every discovery message, the handler for a discovery message event for the outer container of a given embedded content frame can determine whether it is the intended recipient of the discovery message by checking whether the source (i.e., the second execution context) of the discovery message is a descendant of the execution context for the outer container of the embedded content frame. For example, if a connection service in an outer iFrame of a first embedded content frame determines that a first detected discovery message was transmitted from an inner iFrame nested within the outer iFrame, then the connection service can determine that it was the intended recipient of the discovery message and can respond to the message by continuing the procedure to establish a bi-directional communication channel as disclosed with respect to FIG. 5. If the discovery message was transmitted from a non-familial source (e.g., not from a descendant in the same embedded content frame), then the connection service of the outer iFrame can determine that it was not the intended recipient of the discovery message and can therefore discard the message.

Figure 6:
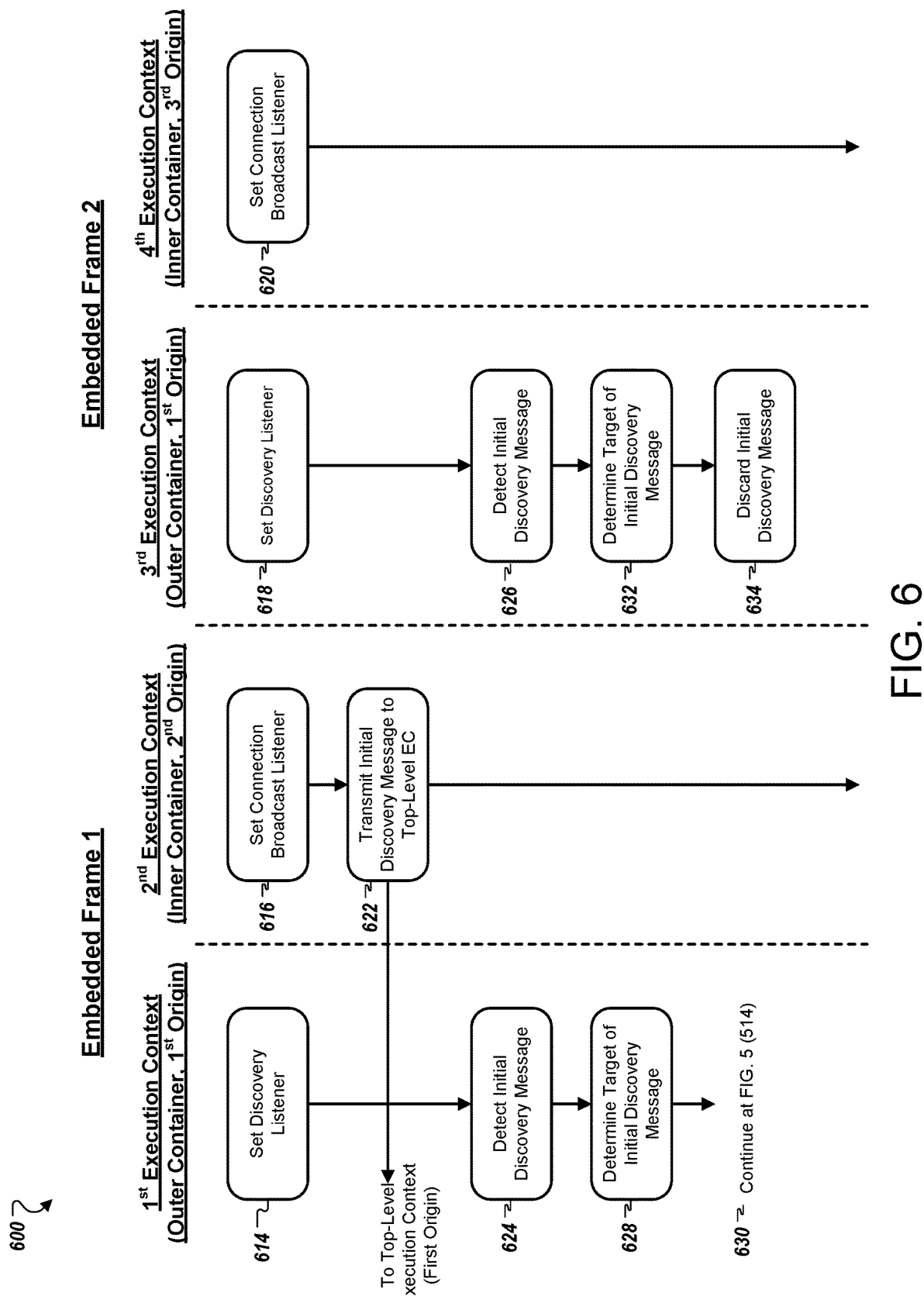
FIG. 6 depicts a swim-lane diagram of an example process for establishing a cross-origin bi-directional communication channel for an electronic document that includes multiple embedded content frames.

FIG. 6 is a swim-lane diagram of an example process 600 for establishing a cross-origin bi-directional communication channel when multiple embedded content frames are provided in a document. The diagram shows actions that may be taken by connection services in containers of two embedded content frames to establish a dedicated bi-directional communication channel for each embedded content frame. In some implementations, each embedded content frame is arranged similarly to frame 201 from FIG. 2, and each includes an outer container that presents content from a same origin as content of a top-level container that hosts each of the embedded content frames. Inner containers in each of the embedded content frames may present content from one or more origins that are different from the origin of the outer frames and the top-level container. The computing system may instantiate individual execution contexts to respectively execute content from each of the containers. In some implementations, the techniques disclosed herein beneficially permit multiple embedded content frames to use identical or similar scripts (e.g., connection services) to connect to an execution context of the top-level container at the same time, even when each inner frame sends an identical discovery message to the top-level execution context.

At stage 614, the first execution context sets a discovery message listener in the top-level execution context. Likewise, at stage 618, the third execution context also sets a discovery message listener in the top-level execution context. At stages 616 and 620, the second execution context and the fourth execution context both set connection broadcast listeners within their respective execution contexts. At stage 622, the second execution context transmits an initial discover message to the execution context of the top-level container. At stages 624 and 626, the discovery listeners from both embedded content frames detect the initial discovery message from the second execution context. Then, at stage 628, the first execution context determines that it is the target (e.g., intended recipient) of the initial discovery message because a value of a property of the message indicates that the message was transmitted from a descendant of the first execution context. In contrast, at stage 628, the third execution context determines that it is not the target of the initial discovery message because it was not transmitted from a descendant of the third execution context, and was therefore not from an inner container of the same embedded content frame. The third execution context thus ignores the discovery message and discards it without taking further action to establish a connection with the second execution context. The first execution context, on the other hand, proceeds from stage 514 (FIG. 5) to continue establishing and validating a bi-directional communication channel.

Figure 7:
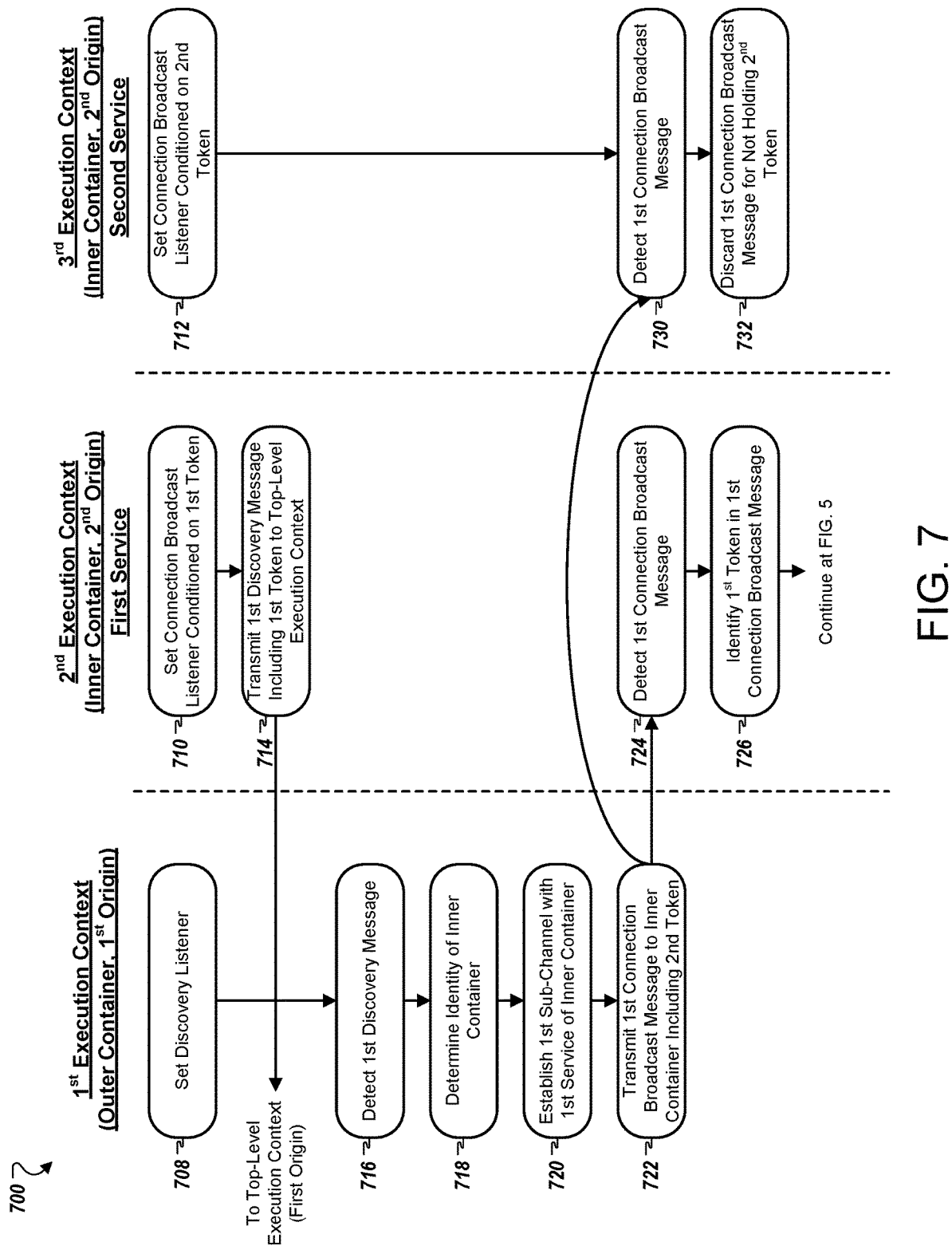
FIG. 7 depicts a swim-lane diagram of an example process for multiplexing bi-directional communication channels for multiple services in an execution context.

FIG. 7 is a swim-lane diagram of an example process 700 for multiplexing bi-directional communication channels for multiple services in an execution context. For example, an embedded content frame may present content in an inner container (e.g., an iFrame or other window object) that includes a first run-time service configured to use a bi-directional communication channel to pass instructions to close the embedded content frame when a user has selected a particular control element in the top-level container. The inner container may further include a second run-time service configured to use a bi-directional communication channel to pass cross-origin instructions to update content in the top-level container based on a selection of a control element in the inner container. In some implementations, each of the services may require a dedicated bi-directional communication channel. The process 700 indicates an example technique by which multiple channels can be established between the same pair of cross-origin execution contexts. In some implementations, each channel is assigned to a different one of multiple services associated with one of the execution contexts. In FIG. 7, the left-most lane indicates operations of a first execution context for an outer container of an embedded content frame; the middle lane indicates operations of a second execution context on behalf of a first service of an inner container of the embedded content frame; and the right-most lane indicates operations of the second execution context for a second service of the inner container of the embedded content frame.

At stage 708, the first execution context sets a discovery message event listener in the execution context for the top-level container, which shares the same origin as the outer container.

At stages 710 and 712, the connection service of the second execution context sets two connection broadcast message event listeners in the second execution context. The first of these listeners is set on behalf of a first run-time service and the second of the listeners is set on behalf of a second run-time service of the inner container. In order to differentiate expected connection broadcast messages that may later be received from a parent execution context (e.g., the first execution context), the first listener is configured to detect only connection broadcast messages that include a first token associated with the first run-time service. Likewise, the second listener is configured to detect only connection broadcast messages that include a second token associated with the second run-time service.

At stage 714, the second execution context transmits a discovery message to the top-level execution context to indicate a request to establish a bi-directional communication channel. The transmitted discovery message can include the first token associated with the first run-time service, to indicate that the channel is to be setup with respect to the first run-time service.

At stage 716, the first execution context detects, based on an indication from the discovery message listener, the discovery message from the second execution context. At stage 718, the first execution context analyzes the discovery message to determine the source of the message. For example, the first execution context may determine an identifier of the second execution context from a property associated with the discovery message. Using the identifier of the second execution context, at stage 720, the first execution context then establishes a first uni-directional sub-channel with the first service of the second execution context. The first uni-directional sub-channel can be associated with the first service by configuring the first sub-channel to include the first token that was included in the discovery message in subsequent messages transmitted over the first uni-directional sub-channel to the second execution context. At stage 722, the first execution context then transmits a first connection broadcast message to the second execution context over the first uni-directional sub-channel. The first connection broadcast message includes the first token to indicate that the message pertains to the first run-time service of the second execution context.

As a result of transmitting the first connection broadcast message to the second execution context, the second execution context receives the message and is detected by the connection broadcast listeners (stages 724 and 730). At stage 726, the second execution context analyzes the first connection broadcast message, identifies the first token in the message, and determines from the first token that the message pertains to the first run-time service. The process 700 can then proceed to stage 522 (FIG. 5) to establish and validate a bi-directional communication channel between the first execution context and the first service of the second execution context. The first token can be included in subsequent messages between the first and second execution contexts during establishment of the channel and for transmitting data after establishing the channel to indicate that the messages pertain to the first run-time service.

In contrast, at stage 732, the second execution context determines that the first connection broadcast message does not contain the second token associated with the second run-time service, and therefore the first connection broadcast message does not pertain to the second-run time service. Accordingly, the second execution context discards the first connection broadcast message with respect to the second run-time service and selects not to establish a channel between the first execution context and the second run-time service of the second execution context. Although not shown in the diagram of FIG. 7, in some implementations, a separate channel may be established for communicating between the first execution context and the second run-time service of the second execution context.

In some implementations, to harden the security of bi-directional communication channels, a whitelist of permissible origins may be maintained by either or both of the first and second execution contexts. If a discovery message is received in an execution context for a first origin requesting to establish a bi-directional channel with another execution context for a second origin, the execution context for the first origin may check the whitelist to determine whether the second origin appears (e.g., whether a domain of the second origin is a trusted domain in the whitelist). If the second origin is not on the whitelist, then the execution context for the first origin may reject the request to establish a communication channel. In some implementations, banned origins can be added to a blacklist, which is checked before accepting a request to establish a channel for cross-origin execution contexts.

Figure 8:
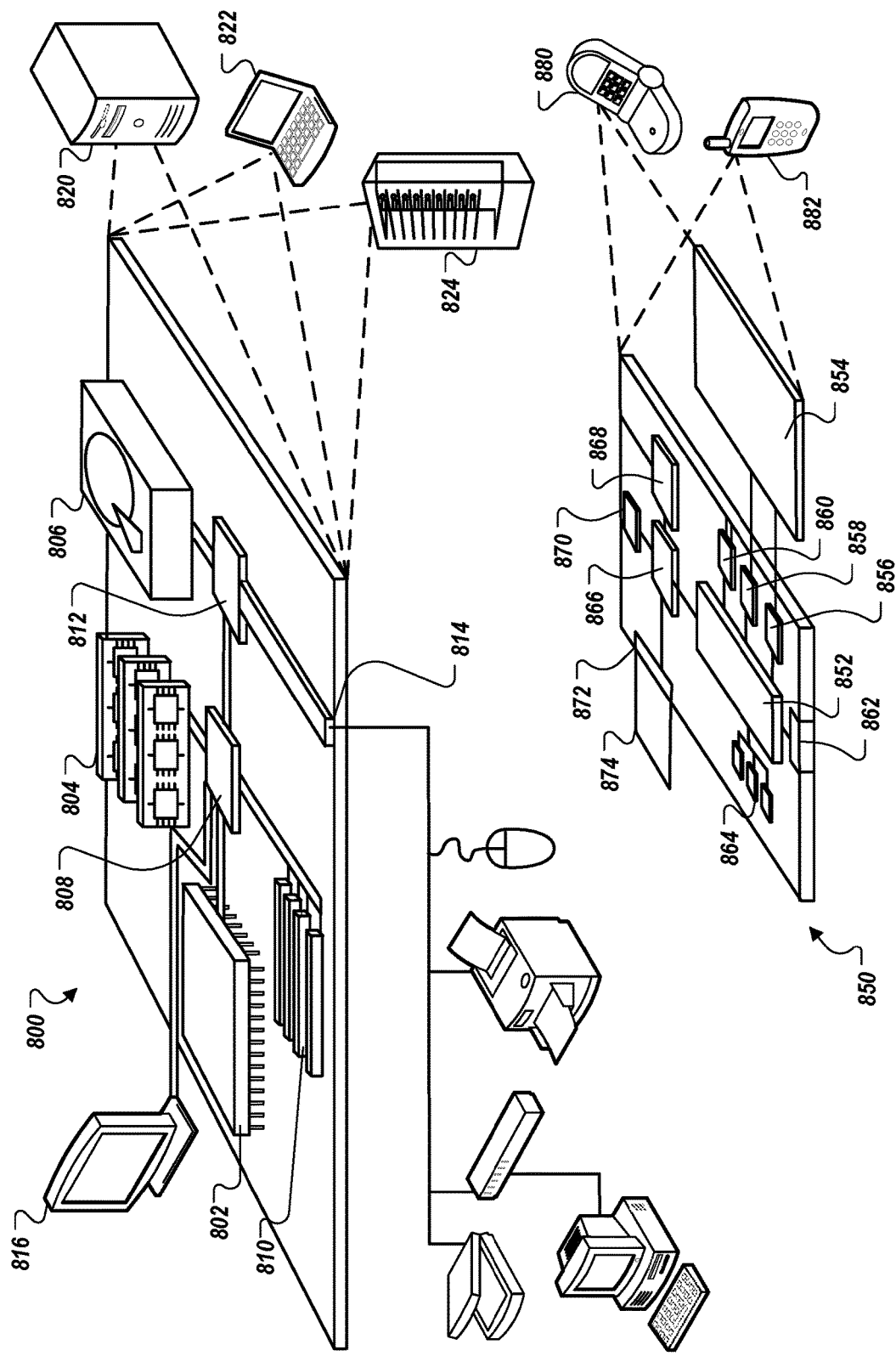
FIG. 8 shows an example of a computing device and a mobile computing device that can be used to implement the techniques described herein.

FIG. 8 shows an example of a computing device 800 and a mobile computing device that can be used to implement the techniques described herein. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage.

Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for communicating data between a first execution context on a computing system and a second execution context on the computing system,
   wherein the first execution context executes content from a first origin,
   wherein the second execution context executes content from a second origin that is different from the first origin, and
   wherein the first execution context and the second execution context are each restricted from accessing data of the other as a result of a same-origin policy implemented by the computing system, the method comprising:
   establishing a bi-directional communication channel between the first execution context and the second execution context, including:
      receiving, in the first execution context, an initial discovery message that was transmitted from the second execution context;
      determining, in the first execution context and based on the initial discovery message that was transmitted from the second execution context, an identifier of the second execution context;
      establishing, using the identifier of the second execution context, a first uni-directional sub-channel of the bi-directional communication channel, the first uni-directional sub-channel configured to carry messages from the first execution context to the second execution context;
      receiving, in the second execution context, a connection broadcast message that was transmitted from the first execution context over the first uni-directional sub-channel;
      determining, in the second execution context and based on the connection broadcast message that was transmitted from the first execution context over the first uni-directional sub-channel, an identifier of the first execution context;
      establishing, using the identifier of the first execution context, a second uni-directional sub-channel of the bi-directional communication channel, the second uni-directional sub-channel configured to carry messages from the second execution context to the first execution context; and
      after the establishment of the first uni-directional sub-channel that is configured to carry messages from the first execution context to the second execution context and the establishment of the second uni-directional sub-channel that is configured to carry messages from the second execution context to the first execution context, validating that the first uni-directional sub-channel and the second uni-directional sub-channel are in a connected state; and
   communicating messages between the first execution context and the second execution context over the validated, bi-directional communication channel.

2. The computer-implemented method of claim 1, wherein in accordance with the same-origin policy, the computing system classifies the second origin as being different from the first origin in response to identifying that at least one of transmission protocols, addresses, or port numbers of the first origin and the second origin differ from each other.

3. The computer-implemented method of claim 1, wherein the first execution context comprises a first window object configured to present the content from the first origin, wherein the second execution context comprises a second window object configured to present the content from the second origin.

4. The computer-implemented method of claim 3, wherein:
   the content presented in the first window object comprises a first web page that is hosted by one or more servers at a first domain associated with the first origin;

the content presented in the second window object comprises a second web page that is hosted by one or more servers at a second domain associated with the second origin; and the second window object is an inline frame (iFrame) that is embedded in the first web page.

5. The computer-implemented method of claim 1, further comprising:

generating the first execution context and the second execution context with a web browsing application of the computing system, wherein the first uni-directional sub-channel is configured to carry messages from the first execution context to the second execution context using a postMessage application programming interface (API) of the web browsing application, wherein the second uni-directional sub-channel is configured to carry messages from the second execution context to the first execution context using the postMessage API of the web browsing application.

6. The computer-implemented method of claim 1, wherein:

the second execution context is a descendant of the first execution context in a hierarchy of execution contexts on the computing system, and determining, in the first execution context and based on the initial discovery message that was transmitted from the second execution context, the identifier of the second execution context comprises accessing a value of a source identifier field of the initial discovery message.

7. The computer-implemented method of claim 1, wherein validating that the first uni-directional sub-channel and the second uni-directional sub-channel are in a connected state comprises:

transmitting, from the second execution context and to the first execution context, a first channel connection message;

receiving, in the first execution context, the first channel connection message transmitted from the second execution context;

in response to receiving the first channel connection message, marking the bi-directional communication channel as being in a connected state at the first execution context;

transmitting, from the first execution context and to the second execution context, a second channel connection message;

receiving, in the second execution context, the second channel connection message transmitted from the first execution context; and in response to receiving the second channel connection message, marking the bi-directional communication channel as being in the connected state at the second execution context.

8. The computer-implemented method of claim 7, wherein one or more services in the first execution context are configured use the bi-directional communication channel to carry messages from the first execution context to the second execution context in response to identifying that the first uni-directional sub-channel is in the connected state, wherein the one or more services in the first execution context are configured to perform alternative actions rather than using the bi-directional communication channel to carry messages from the first execution context to the second execution context in response to identifying that the first-uni-directional sub-channel is in an unconnected state.

9. The computer-implemented method of claim 1, further comprising:

determining, in the first execution context, whether the first execution context was a target of the initial discovery message from the second execution context by checking whether the second execution context is a descendant of the first execution context in a hierarchy of execution contexts on the computing system; and in response to identifying that the second execution context is a descendant of the first execution context:
  (i) determining that the first execution context was the target of the initial discovery message from the second execution context and proceeding to establish the first uni-directional sub-channel, and
  (ii) selecting to establish the first uni-directional sub-channel between the first execution context and the second execution context.

10. The computer-implemented method of claim 1, further comprising:

receiving, in the first execution context, a second initial discovery message that was transmitted from a third execution context that executes content from an origin other than the first origin, wherein the first execution context and the third execution context are each restricted from accessing data of the other as a result of the same-origin policy implemented by the computing system;

determining, in the first execution context, whether the first execution context was a target of the second initial discovery message from the third execution context by checking whether the third execution context is a descendant of the first execution context in a hierarchy of execution contexts on the computing system; and in response to identifying that the third execution context is not a descendant of the first execution context, discarding the second initial discovery message so as to not establish a communication channel between the first execution context and the third execution context.

11. The computer-implemented method of claim 1, further comprising:

identifying, in the first execution context, that the initial discovery message from the second execution context contains a first token that indicates the initial discovery message is to initiate establishment of a first channel between the first execution context and a first service of the second execution context;

receiving, in the first execution context, a second initial discovery message that was transmitted from the second execution context;

identifying, in the first execution context, that the second initial discovery message from the second execution context contains a second token that indicates the second initial discovery message is to initiate establishment of a second channel between the first execution context and a second service of the second execution context that is different from the first service of the second execution context.

12. The computer-implemented method of claim 1, comprising, after establishing the bi-directional communication channel between the first execution context and the second execution context:

identifying a user interaction with a control element displayed within a presentation of the first execution context; and in response to identifying the user interaction with the control element displayed within the presentation of the first execution context, transmitting, over the bi-directional communication channel from the first execution context and to the second execution context, an indication of the user interaction with the control element displayed within the presentation of the first execution context.

13. The computer-implemented method of claim 12, wherein the user interaction with the control element displayed within the presentation of the first execution context indicates an instruction to hide or close a presentation of the content executed by the second execution context.

14. A computing system comprising one or more processors and one or more non-transitory computer-readable media encoded with instructions that, when executed, cause the one or more processors to implement:
  a first execution context that executes content from a first origin;
  a second execution context that executes content from a second origin that is different from the first origin; and
  a security application that restricts each of the first execution context and the second execution context from accessing data of the other in accordance with a same-origin policy implemented by the security application;
  wherein the first execution context and the second execution context are configured to establish a bi-directional communication channel by performing operations that comprise:
    receiving, in the first execution context, an initial discovery message that was transmitted from the second execution context;
    determining, in the first execution context and based on the initial discovery message that was transmitted from the second execution context, an identifier of the second execution context;
    establishing, using the identifier of the second execution context, a first uni-directional sub-channel of the bi-directional communication channel, the first uni-directional sub-channel configured to carry messages from the first execution context to the second execution context;
    receiving, in the second execution context, a connection broadcast message that was transmitted from the first execution context over the first uni-directional sub-channel;
    determining, in the second execution context and based on the connection broadcast message that was transmitted from the first execution context over the first uni-directional sub-channel, an identifier of the first execution context;
    establishing, using the identifier of the first execution context, a second uni-directional sub-channel of the bi-directional communication channel, the second uni-directional sub-channel configured to carry messages from the second execution context to the first execution context; and
    after the establishment of the first uni-directional sub-channel that is configured to carry messages from the first execution context to the second execution context and the establishment of the second uni-directional sub-channel that is configured to carry messages from the second execution context to the first execution context, validating that the first uni-directional sub-channel and the second uni-directional sub-channel are in a connected state;
    wherein messages are communicated between the first execution context and the second execution context over the validated, bi-directional communication channel.

15. The computing system of claim 14, wherein the operations further comprise:
  determining, in the first execution context, whether the first execution context was a target of the initial discovery message from the second execution context by checking whether the second execution context is a descendant of the first execution context in a hierarchy of execution contexts on the computing system; and
  in response to identifying that the second execution context is a descendant of the first execution context:
    (i) determining that the first execution context was the target of the initial discovery message from the second execution context and proceeding to establish the first uni-directional sub-channel, and
    (ii) selecting to establish the first uni-directional sub-channel between the first execution context and the second execution context.

16. The computing system of claim 14, wherein the operations further comprise:
  receiving, in the first execution context, a second initial discovery message that was transmitted from a third execution context that executes content from an origin other than the first origin, wherein the first execution context and the third execution context are each restricted from accessing data of the other as a result of the same-origin policy implemented by the computing system;
  determining, in the first execution context, whether the first execution context was a target of the second initial discovery message from the third execution context by checking whether the third execution context is a descendant of the first execution context in a hierarchy of execution contexts on the computing system; and
  in response to identifying that the third execution context is not a descendant of the first execution context, discarding the second initial discovery message so as to not establish a communication channel between the first execution context and the third execution context.

17. The computing system of claim 14, wherein the operations further comprise:
  identifying, in the first execution context, that the initial discovery message from the second execution context contains a first token that indicates the initial discovery message is to initiate establishment of a first channel between the first execution context and a first service of the second execution context;
  receiving, in the first execution context, a second initial discovery message that was transmitted from the second execution context;
  identifying, in the first execution context, that the second initial discovery message from the second execution context contains a second token that indicates the second initial discovery message is to initiate establishment of a second channel between the first execution context and a second service of the second execution context that is different from the first service of the second execution context.

18. One or more non-transitory computer-readable media having instructions stored thereon that, when executed by one or more processors of a computing system, cause the one or more processors to perform operations for communicating data between a first execution context on the computing system and a second execution context on the computing system,
    wherein the first execution context is configured to execute content from a first origin,
    wherein the second execution context is configured to execute content from a second origin that is different from the first origin, and
    wherein the first execution context and the second execution context are each restricted from accessing data of the other as a result of a same-origin policy of the computing system, the operations comprising:
    establishing a bi-directional communication channel between the first execution context and the second execution context, including:
        receiving, in the first execution context, an initial discovery message that was transmitted from the second execution context;
        determining, in the first execution context and based on the initial discovery message that was transmitted from the second execution context, an identifier of the second execution context;
        establishing, using the identifier of the second execution context, a first uni-directional sub-channel of the bi-directional communication channel, the first uni-directional sub-channel configured to carry messages from the first execution context to the second execution context;
        receiving, in the second execution context, a connection broadcast message that was transmitted from the first execution context over the first uni-directional sub-channel;
        determining, in the second execution context and based on the connection broadcast message that was transmitted from the first execution context over the first uni-directional sub-channel, an identifier of the first execution context;
        establishing, using the identifier of the first execution context, a second uni-directional sub-channel of the bi-directional communication channel, the second uni-directional sub-channel configured to carry messages from the second execution context to the first execution context; and
    after the establishment of the first uni-directional sub-channel that is configured to carry messages from the first execution context to the second execution context and the establishment of the second uni-directional sub-channel that is configured to carry messages from the second execution context to the first execution context, validating that the first uni-directional sub-channel and the second uni-directional sub-channel are in a connected state; and
    communicating messages between the first execution context and the second execution context over the validated, bi-directional communication channel.

19. The computer-readable media of claim 18, wherein in accordance with the same-origin policy, the computing system classifies the second origin as being different from the first origin in response to identifying that at least one of transmission protocols, addresses, or port numbers of the first origin and the second origin differ from each other.

20. The computer-readable media of claim 18, wherein the first execution context comprises a first window object configured to present the content from the first origin, wherein the second execution context comprises a second window object configured to present the content from the second origin.

* * * * *

UNITED STATES PATENT AND TRADEMARK OFFICE
CERTIFICATE OF CORRECTION

| | | |
|---|---|---|
| PATENT NO. | : 10,554,692 B2 | Page 1 of 1 |
| APPLICATION NO. | : 15/624921 | |
| DATED | : February 4, 2020 | |
| INVENTOR(S) | : Frisbie | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this
Eighth Day of September, 2020

Andrei Iancu
*Director of the United States Patent and Trademark Office*